March 15, 1927.

A. CAMPBELL

LOAD DISCHARGING CAR

Filed Aug. 7, 1925

1,620,948

5 Sheets-Sheet 2

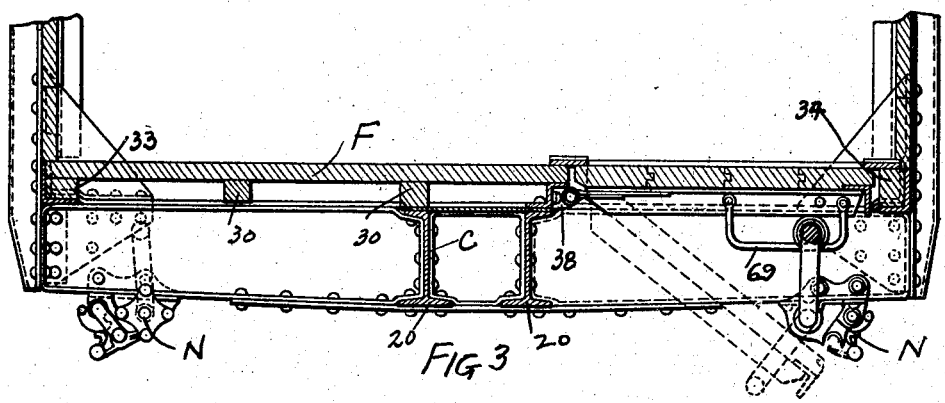
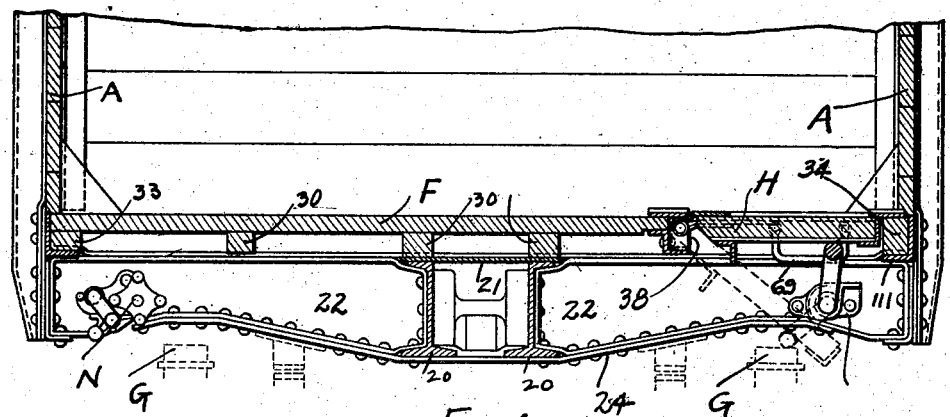
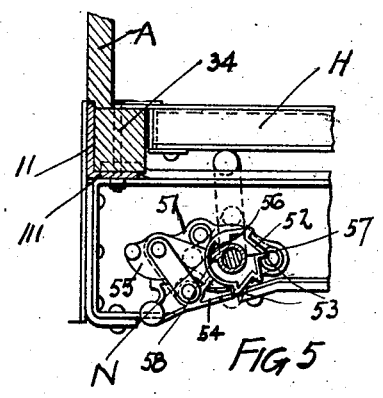
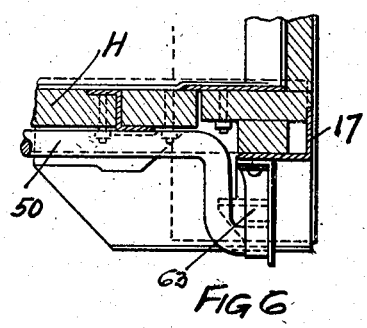

March 15, 1927. 1,620,948
A. CAMPBELL
LOAD DISCHARGING CAR
Filed Aug. 7, 1925   5 Sheets-Sheet 4
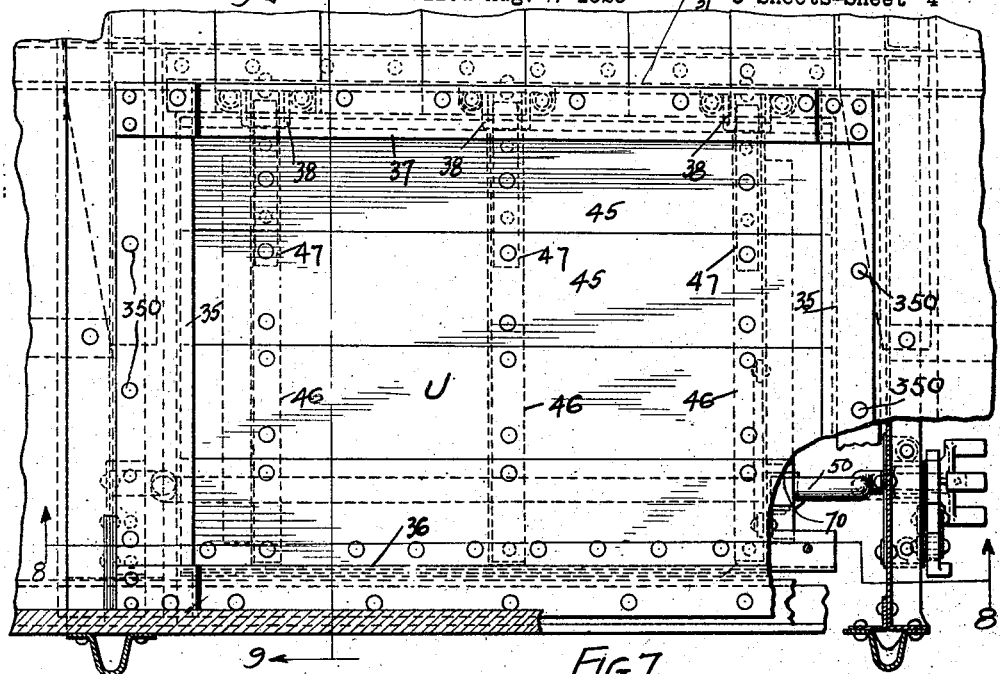
FIG 7
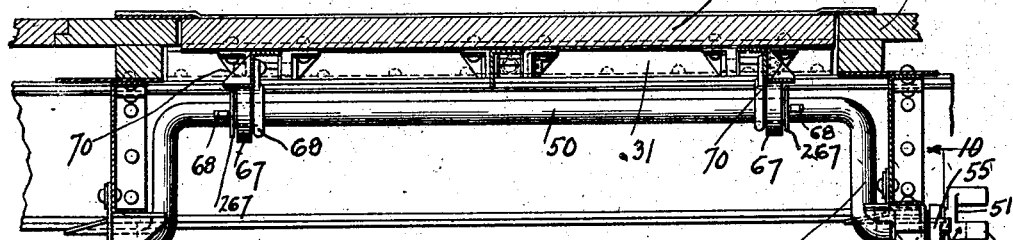
FIG 8
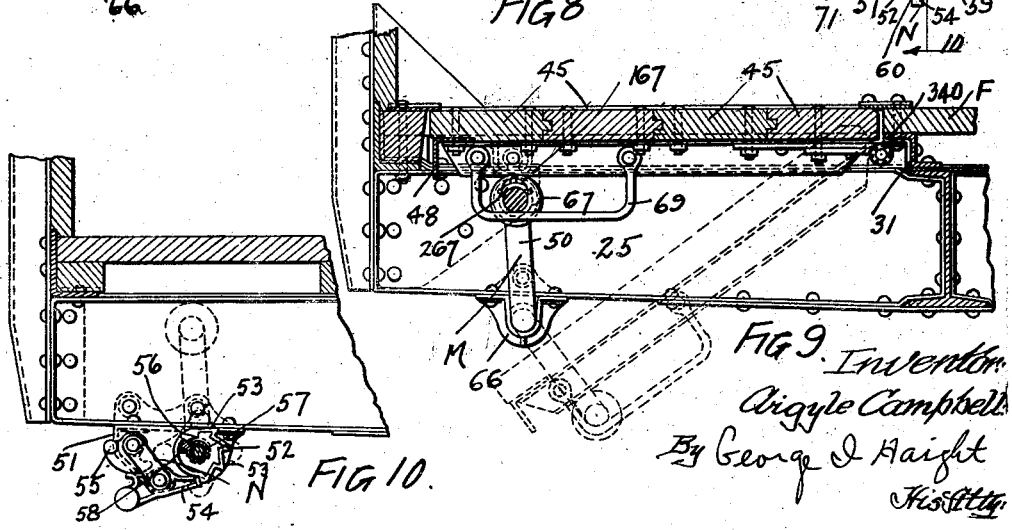
FIG 9.
FIG 10.
Inventor
Argyle Campbell
By George D. Haight
His Atty.

Patented Mar. 15, 1927.

1,620,948

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

LOAD-DISCHARGING CAR.

Application filed August 7, 1925. Serial No. 48,797.

My invention relates to improvements in load-discharging cars, and in some respects is an improvement on the type of car shown in my former U. S. Patent No. 1,455,520, dated May 15, 1923.

One object of my invention is to provide a car having large dumping capacity with comparatively small dumping door area.

Another object of my invention is to provide in a car of the level floor type, an arrangement such that, without materially increasing the height of the floor above the rails, an underframe structure of minimum vertical height may be employed and dumping of substantially the whole load effected through the entire length of the car.

Another object of the invention is to provide a car whereby the various discharge openings in the floor of the car may be safely and conveniently controlled individually from locations adjacent the respective dumping opening.

Other objects of the invention relate to certain features of construction and novel combination of parts such as will be more particularly pointed out hereinafter and claimed.

Figure 1:
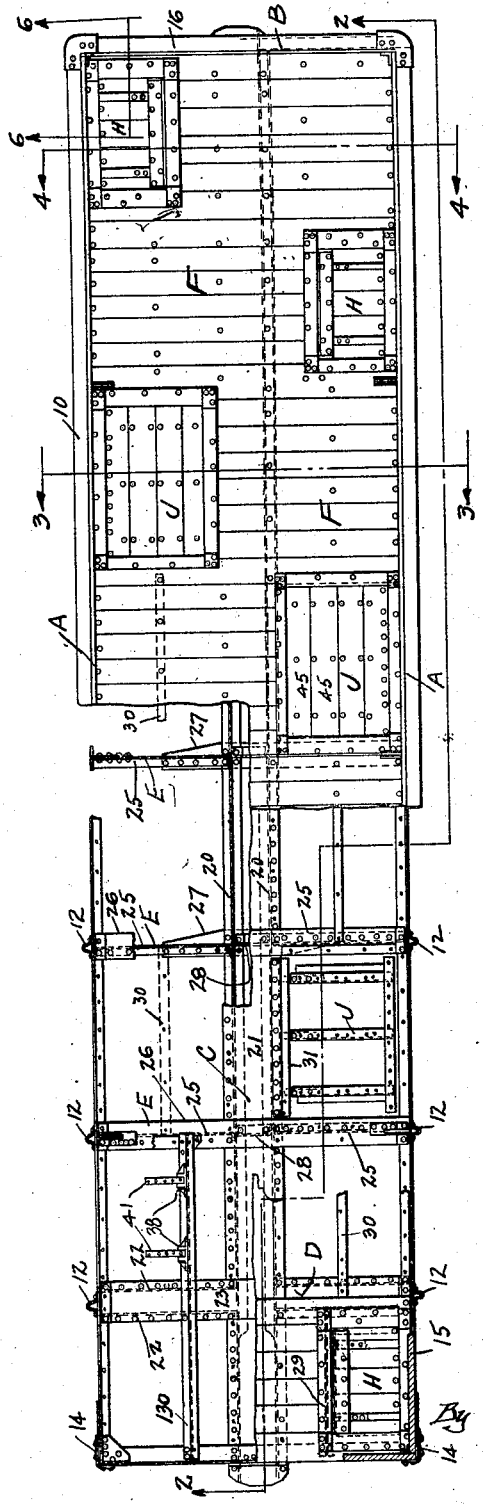
Figure 2:
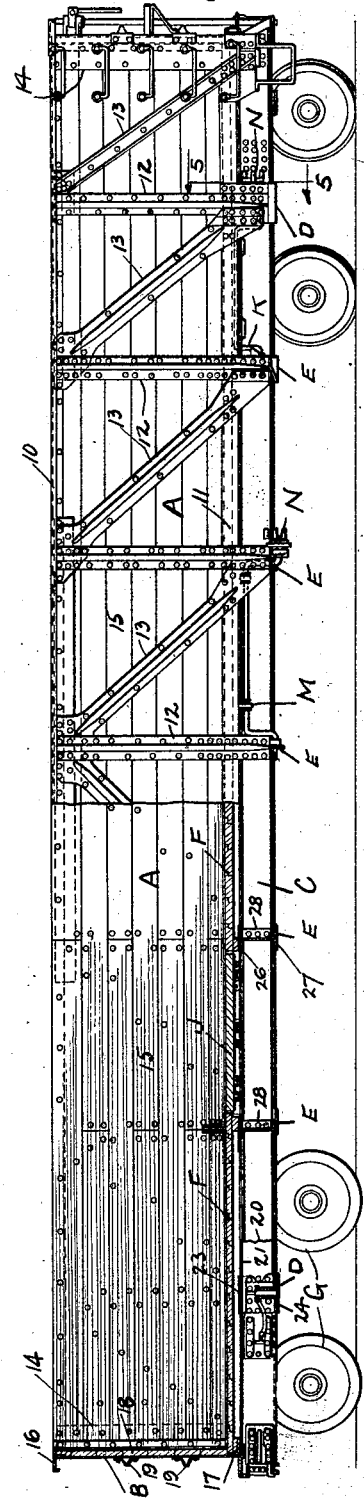
Figure 11:
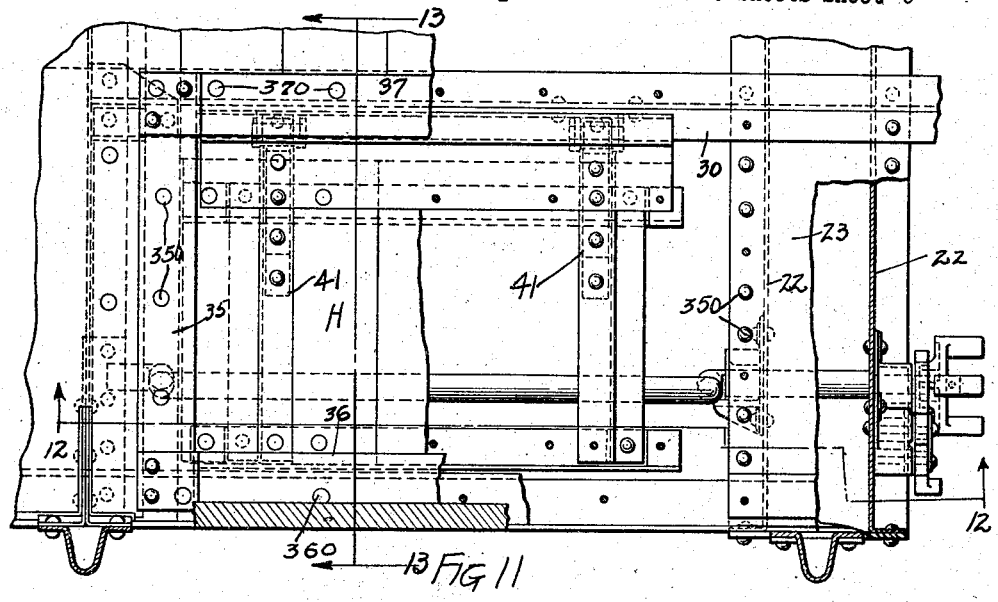
Figure 12:
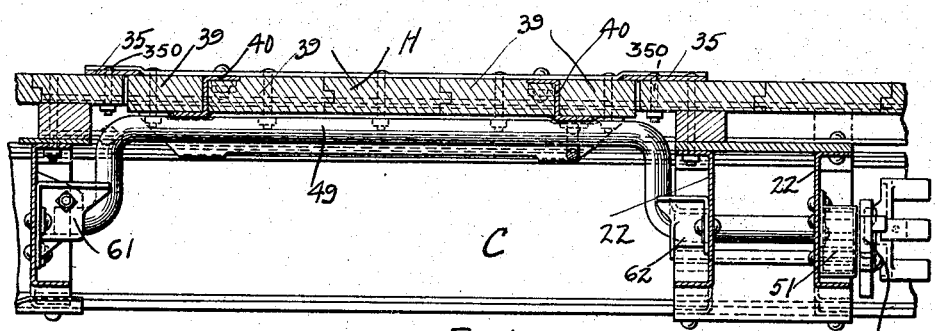
Figure 13:
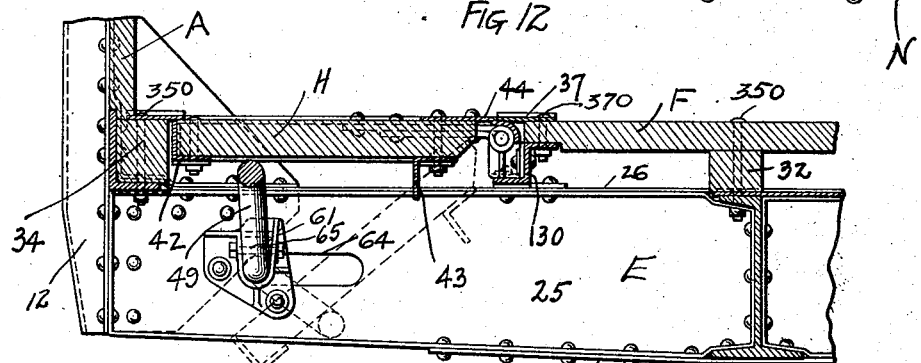

In the drawings forming a part of this specification, Figure 1 is a top plan view of a dump car showing my improvements, the left-hand portion of the plan view having the super-structure broken away in parts to better illustrate the underframe and relation of parts. Figure 2 is a longitudinal, elevational view of the car shown in Fig. 1, the said view being taken on a line corresponding substantially to line 2—2 of Fig. 1, showing the left hand portion of the car as a longitudinal section and the right hand portion as a side elevational view of the car. Figure 3 is an enlarged transverse sectional view taken intermediate the trucks and corresponding substantially to the section line 3—3 of Fig. 1. Fig. 4 is an enlarged transverse sectional view taken above the trucks and corresponding substantially to the section line 4—4 of Fig. 1. Fig. 5 is a fractional transverse sectional view taken through the car adjacent the outer end of a door and taken on a line corresponding substantially to the section line 5—5 of Fig. 2. Fig. 6 is a fractional longitudinal sectional view taken through one of the end doors and illustrating the method of support of the same and the end wall of the car, said view being taken on a line corresponding to line 6—6 of Fig. 1. Fig. 7 is a plan view on an enlarged scale of a sufficient portion of the car to illustrate one of the large floor doors, the said door and flooring in certain parts being broken away to better illustrate the construction of the mechanism. Fig. 8 is a sectional elevational view taken through Fig. 7 and on a line corresponding substantially to line 8—8 thereof. Fig. 9 is a vertical transverse sectional view taken through the car on a line corresponding substantially to a line 9—9 of Fig. 7. Fig. 10 is a fractional sectional view showing so much of the car as will illustrate the door locking mechanism, the section being taken on a line corresponding substantially to line 10—10 of Fig. 8. Fig. 11 is a plan view, on an enlarged scale, of a sufficient portion of the car to illustrate one of the small floor doors. Fig. 12 is an elevational sectional view taken of a portion of Fig. 11 and corresponding substantially to line 12—12 of the same. And Fig. 13 is a vertical transverse sectional view taken through the car corresponding to line 13—13 of Fig. 11.

In said drawings, the car is shown as including side walls A; end walls B; center sills C; body bolsters D; cross-beams E; fixed flooring F; trucks G; small dumping floor doors H; large dumping doors J; door operating means K for the doors H; door operating means M for the doors J; and shaft-rotating means N.

Referring more particularly to Fig. 2, it will be noted that the side walls A of the car are each formed of truss construction including upper chord 10, lower chord 11, vertical posts 12, diagonal members 13, corner posts 14, and longitudinally extending side boards 15. Each of the end walls B includes a top member 16 and lower member 17, end boards 18, and a series of horizontal bracing members 19—19. The center sills of the car include a plurality of flanged beam members 20—20 united with longitudinally extending cover plates 21. Each body bolster D includes a plurality of vertically disposed sections 22—22 spaced from each other and united by top and bottom cover plates as indicated at 23 and 24 respectively and which extend transversely of the car.

Each crossbeam E is formed of vertically disposed sections 25 of pan shape disposed intermediate the center sill and side walls of the car, said sections on the opposite sides of the center sill being connected by transversely extending top and bottom cover plates as indicate at 26 and 27, respectively, the center sills at the cross beams being spaced by diaphragms 28 which serve to effect continuity of the crossbeams. The cross-beams and bolsters of the car are spaced from each other longitudinally of the car and the space intermediate said transverse members thus present panel-like spaces which may be utilized for dumping openings or covered by fixed floor sections such as indicated at F. Said fixed floor sections F are alternated with the dumping openings, there being a fixed floor section, extending from one cross member to the other, disposed on the right of each door opening as viewed by an operator as he faces the car. As shown in Fig. 1, the series of dumping openings and fixed floor sections on one side of the center sill are duplicated on the opposite side of the center sill, the door openings on one side of the center sill being transversely aligned with fixed floor sections on the opposite side of the center sill, thereby presenting a floor having alternated and staggered fixed floor sections and dumping openings.

The floor of the car is substantially a level floor and is spaced somewhat above the underframe, said underframe including the center sill, bolsters and cross-beams; a series of longitudinally extending stringers are interposed in the said space betwen the underframe and floor as indicated at 29, 30, 31, 32, 33 and 34 respectively. The stringers 29 and 31 are preferably metallic members of Z-shape and adapted to sustain the outer edge of the fixed floor sections as well as form suitable members to support the hinge end of the respective dumping doors H and J. Said member 29, which extends from the end wall of the car to the bolster, is spaced outwardly from the center sill of the car, thereby making provision for the hinging of the small doors H, at an appreciable distance from the center sill. The doors H, which are disposed above the trucks, are smaller than the doors placed intermediate the trucks, thereby making it possible to dispose a door above the truck parts which will have sufficient slope when open to shed the lading and sufficient door opening to permit the load to pass therethrough without unduly increasing the height of the floor. The relation of the door H, when in opened position, to the parts of the truck parts G is indicated by dotted lines in Fig. 4. In addition to their function as floor and door supporting members the stringers 29 and 31 also serve to brace the underframe horizontally by bracing the end of the car relatively to the bolster and for this purpose each member 130 which supports the door in the second panel from the end wall of the car is longer than its corresponding member 29 on the opposite side of the center sill, as it is extended beyond the adjacent body bolster and connected to the horizontal flange of the lower member of the end wall. Intermediate the trucks, the metallic stringers 31 are also preferably of Z-shape and connected to the center sill and so disposed that the top flange 340 of each Z-member extends outwardly from the center sill and forms a support for the overhanging portion of the adjacent fixed floor portion F. The fixed floor portions F are supported intermediately by the series of longitudinally extending stringers 32 which preferably consist of wooden beams respectively supported by the center sills and crossbeams.

The side walls of the car are extended downwardly below the level of the floor and the horizontal flange 111 of the lower chord member 11 lies against and is secured to the tops of the respective cross members. Said horizontal flanges beneath the fixed floor sections F carry the floor supporting stringers 33 and adjacent the free edge of the dumping doors H and J the said flanges support the stringer members 34 which are formed of sufficient depth to bring the upper surface thereof substantially in alinement with the upper surface of the fixed floor sections F.

The discharge openings are fitted around the edges thereof with sealing edge plates which overlap the respective doors, said plates at the side edges of the doors being indicated at 35—35 secured in position by securing means, such as bolts or rivets indicated at 350, certain of which extend through the plate, the floor, and portions of the cross beam. The front and rear edge plates are indicated at 36 and 37 respectively the plates 36 and 37 being secured in position by securing means, such as bolts or rivets, indicated respectively at 360 and 370, the securing means 370 at the rear edge of the door extending through the plate, the floor, and being secured to one flange of the stringer 31, while the securing means 370 for the plate at the forward edge of the door extend through the plate 37, the floor, and one flange of the bottom chord 11, the said front and rear plates being overlappingly related to the side edge plates. The respective doors H and J are supported at the inner edges from hinge brackets 38 secured to the respective metallic stringers.

Referring first to the small dumping doors H, as shown more in detail in Figs. 4 to 6 inclusive and Figs. 11 to 13 inclusive, said doors are formed of a series of boards 39 extending in the direction of flow of the material when the door is in an inclined position and interposed between certain of said boards are a plurality of preferably Z-shaped battens 40 to which hinge straps 41 are secured and whereby the door is hingedly mounted on the hinge brackets 38. Each door H is braced transversely to the hinge battens 40 by members 42 and 43 which are preferably of angle shape and extend across the plane of said hinge battens 40 and are secured thereto, the member 42 which is disposed adjacent the free edge of the door being disposed with the vertical flange thereof extending upwardly and in the plane of the door boards and the member 43, which is disposed adjacent the rear edge of the door, being disposed with the vertical flange thereof extending downwardly and away from the door boards. The inner edge of the door is fitted with a metallic plate 44 which is formed of arcuate shape and is adapted to co-operate with the rear sealing edge plate 37 on the car to maintain a tight joint.

The large doors J, as shown more particularly in Fig. 3 and Figs. 7 to 10 inclusive, are each formed of a series of boards 45 extending longitudinally of the car and braced transversely thereof by battens 46, the two outer ones being preferably of Z-shape. At the hinged edge of the door, each said batten is fitted with a hinge strap 47 whereby the door is mounted on the hinge brackets 38. Adjacent the free edge of the door, it is reinforced by a beam member 48 extending across the plane of the various battens 46 and secured to said members.

The various doors H and J are adapted to be operated independently of each other, preferably by means of mechanisms as indicated at K and M and which respectively include crank shafts 49 and 50. The crank shafts 49 and 50 for the respective door mechanisms K and M operate in the same manner but differ in the lengths of cranks and in methods of mounting on the car structure. Said crank shafts 49 and 50 are adapted to be rotated and locked by the rotating means N, which are similar in all main respects, consequently the same description will suffice for both shafts. Each mechanism N is mounted adjacent a fixed bearing 51, through which one end of the shaft is extended. Fixedly mounted on said projecting end of the shaft is a ratchet wheel 52 having on the outer periphery thereof a plurality of external teeth 53 with which a pivoted weighted locking pawl 54 is co-operable, said pawl 54 being adapted to be locked in position by a locking cam 55, both said pawl and cam being pivotally mounted on the fixed bearing 51. Said ratchet wheel is also provided with a fixed lug 56 with which a rotatable, loosely mounted member 57 having a lug 58, is adapted to co-operate, to rotate said ratchet wheel in either direction. Said member 57, which is formed with a plurality of outstanding fulcrums or prongs 59 adapted to accommodate therebetween a removable lever, is maintained in operating relation with its corresponding ratchet wheel through the medium of a pin or rivet 60.

The door operating mechanisms shown herein are, in some respects, similar to those shown in my pending application U. S. Serial No. 748,542, for door supporting and raising means, filed November 8, 1924, but differ in the manner of application and in the mounting of the said shafts inasmuch as I have herein modified the car construction in order to permit of bringing the doors, when in the closed position, well above the underframe, thereby reducing the depth of underframe and permitting the mounting of the ends of the crank shafts in bearings either secured directly to the cross members or disposed immediately below the same and reducing the turning moment on said bearings when the crank shafts are called to sustain the impact of the doors.

The shafts 49, which are adapted for operating the small doors adjacent the bolsters of the car, are each pivotally supported at one end in a bracket 61 carried by the crossbeam and the opposite end of the shaft is extended through the spaced sections 22—22 of the bolster as best indicated in Figs. 11 and 12 and a bearing 62 is mounted on the side of the section nearest the door while the bracket bearing 51, heretofore mentioned, is secured to the adjacent bolster section. It will be noted that, due to the staggered relation of the doors, the arrangement for supporting the shaft brackets on the opposite sides of the bolster are somewhat different, the bracket 63 at the extreme end of the car depending from the horizontal flange of the lower member 17 of the end wall instead of being secured to the face of one of the transverse members. As indicated in Fig. 13, the crossbeam to which the bracket 61 is secured is slotted as indicated at 64 to permit of the insertion of the shaft 49 therethrough. The shaft 49 is locked in fixed relation to the car structure by a bolt 65.

Each of the shafts 50, which support the larger doors J, is mounted in fixed bearings 51 and 66 fixed immediately below the lower portions of the transverse beams, said shaft being adapted to contact with the lower portion of the Z door battens 46 through the medium of rollers 67 which are loosely mounted on the said shaft. Said rollers are formed with elongated slots as indicated at 167. Each roller is arranged to have rotary motion on the shaft by the insertion of a section 267 which converts said slot into a circular opening. Each said section 267 is maintained in operative relation with its corresponding roller by means of a key 68, the roller being secured against longitudinal movement in one direction by a stirrup 69 which also serves to maintain the shaft in fixed relation to the door. The lower flange of each Z batten is braced to the web of the same, adjacent its engagement with the shaft, by means of a bracket 70.

Longitudinal displacement of the shafts relatively to the supporting brackets is guarded against by providing arcuate flanges 71 adapted to engage with the cranks throughout the entire range of movement thereof.

Rollers are preferably not used on the shafts 49 in connection with the small doors H as it is desired to secure maximum door opening above the trucks without material increase of height of the floor from rails and thus by using a door of smaller extent for the doors above the trucks, I am enabled to use a lighter door and a shorter crank shaft and still secure a greater degree of slope than the larger doors.

In this connection, it will also be noted that I use the battens 40 as wear plates on the undersides of the doors H, in lifting and lowering the doors, thus providing a very economical construction, since said battens 40 thus perform the double function of battens and wear plates, and also serve as efficient means for the attachment of the hinge straps 41.

The arrangement of staggered doors to be operated as individual units from beneath adjacent fixed floor sections is exceedingly convenient from an operating view point as portable conveyors may be disposed just beneath the respective doors and when the doors are opened and lading is discharged, it may be conveyed outwardly or upwardly from the car as desired. The crank shafts move rearwardly beneath the doors during the operation of the doors and consequently the doors are entirely devoid of projections extending beyond the free edges of the doors and which would thus normally prevent the use of conveyors in the manner indicated.

It will further be noted from the preceding description and drawings, that the underframe may be made of comparatively shallow height without raising the effective level of the floor to any appreciable degree above the rails, while at the same time the side walls of the car are sustained upon the ends of the cross members of the underframe, and the cross members rigidified by the longitudinal stringers. Furthermore, it will be noted that by supporting the floor upon the stringers, air ventilation is provided beneath the floor, thus minimizing the tendency for moisture to collect, which would accelerate rotting of the boards and corrosion of the metallic members.

I have herein shown and described what I now consider the preferred manner of carrying out my invention, but the same is merely illustrative and I contemplate all changes and modifications that come within the scope of the claims appended hereto.

I claim:

1. In a dump car, the combination with the sides and ends of the car; of an underframe including a longitudinal center sill and cross members outstanding therefrom; of a floor spaced from the said underframe; means interposed between the floor and the underframe, said means including metallic floor beams, some of said floor beams being carried by the center sill and others of said floor beams being disposed outwardly from the center sill and resting on the said transverse members; and dumping doors hinged to said metallic floor beams.

2. In a dump car, the combination with center sill, bolsters and cross beams extending outwardly from said center sill and spaced from each other; a floor disposed above the said center sills and cross beams, metallic beam members on each side of the center sill extending from each end of the car to the adjacent bolster, said beams being disposed outwardly from the center sill of the car; dumping doors forming a portion of the floor, said doors being hinged to said longitudinal beam members; and other dumping doors disposed intermediate said first named doors, said last named doors being hinged adjacent the center sill, the doors on one side of the center sill being alternated with fixed floor sections on the opposite side of the center sill.

3. In a dump car, the combination with an underframe including a center sill and cross beams outstanding therefrom; of a floor spaced from said underframe; metallic beams interposed between the floor of the car and the underframe, said metallic beams adjacent the ends of the car being spaced outwardly from the center sill; and dumping doors hinged to said metallic members, said doors on one side of the center sill of the car being alternated with fixed floor sections on the opposite side of the center sill.

4. In a railway car, the combination with an underframe including center sills and cross members outstanding therefrom, said cross members being spaced from each other longitudinally of the car; a floor disposed above the said underframe and spaced therefrom; longitudinally extending metallic beam members disposed in the space between said underframe and floor, said beam members at the ends of the car being spaced outwardly from the center sill of the car; and doors hinged to said longitudinal beam members, said doors being adapted to close with their free edges adjacent the side wall of the car.

5. In a dump car, the combination with a series of dump doors in the floor alternated with fixed floor sections; of crank mechanisms pivotally mounted adjacent the doors and each having a portion thereof disposed beneath the corresponding door to support the same in closed position and operating to lift the door from open to closed position; and means for operating said mechanisms, said operating means being disposed beneath the adjacent fixed floor sections.

6. In a dump car having fixed floor sections alternated with dumping doors, each door on one side of the car being transversely opposite a fixed floor section; supporting means for the floors and doors including metallic stringers carried by the underframe of the car, said metallic stringers above the trucks of the car being spaced outwardly from the center sill of the car and said metallic stringers intermediate the trucks being mounted adjacent the center sill of the car.

7. In a dump car, the combination with a side wall of the car; of a dumping opening adjacent the side wall of the car; a door hinged on a longitudinal axis disposed inwardly of the side of the car; a fixed floor section extending from the hinged edge of the door to the opposite side wall of the car; supporting means for the edge of said fixed floor adjacent the door, including a longitudinal metallic stringer adapted to also form a supporting means for the hinged edge of the door; and other stringers disposed between said metallic stringer and the side wall of the car.

8. In a dump car having a series of dumping openings; the combination with an underframe; of side walls; a series of longitudinal stringers carried by said underframe; a floor resting on the said stringers; each said dumping opening being defined by a stringer carried by the side wall of the car and on the opposite side by a metallic stringer forming one of the supports for the floor, said floor adjacent each said dumping opening being formed of a fixed floor section, a fixed floor section on one side of the car being staggered in relation to that on the opposite side of the car; and a dumping door for each dumping opening hingedly mounted on the adjacent metallic stringer.

9. In a dump car, the combination with an underframe; of a flanged beam member disposed above said underframe and carried thereby; a floor disposed above said beam member; a dumping door hinged to said beam member; and a sealing edge plate carried by the floor and extending over the door; and securing means extending through said sealing edge plate, the floor and one of the flanges of the beam member.

10. In a dump car having an underframe and a fixed floor disposed above said underframe and spaced therefrom; a side wall rising above said underframe and including a lower chord member having a horizontally disposed flange; a stringer carried by said flange, said stringer having its upper surface substantially level with the upper surface of the fixed floor, a dumping opening intermediate the side wall of the car and a metallic stringer adjacent the edge of the fixed floor, said door being adapted to close with its free edge adjacent the side wall of the car, and edge plates respectively carried by said fixed floor and said stringer carried by the side wall member, said edge plates being adapted to overlap at the corners of the dumping opening.

11. In a dump car, the combination with an underframe; of a stringer disposed above the said underframe, said stringer being in the form of a Z having an outstanding flange; a floor carried by said outstanding flange of the stringer; an edge plate carried by the floor and extending outwardly beyond the same; securing means extending through said edge plate, the floor of the car, and the top flange of the stringer; and a dumping door disposed beneath the edge plate and pivotally mounted to said stringer.

12. In a dump car, the combination with the side wall of the car; of an underframe including center sill and cross beams; a series of dumping doors disposed in the floor of the car, each said door being hinged adjacent a fixed floor section, said fixed floor section extending from the side wall of the car across the plane of the center sill; and a metallic stringer forming supporting means for the marginal edge of the fixed floor and the hinged end of the door, said stringer being carried by the center sill.

13. In a dump car, the combination with the trucks of the car; of a fixed floor having a plurality of door openings formed therein on opposite sides of the center of the car, some of said openings being disposed above the trucks and some of the openings intermediate the said trucks; hinged doors adapted to close said openings, the doors above the trucks being adapted to have a greater swinging movement than those intermediate the trucks, said series of doors from one end of the car to the other being alternated with fixed floor sections and so arranged that the doors on one side of the center are transversely alined with fixed floor sections on the other side of the center of car.

14. In a dump car, the combination with the sides and ends thereof; of an underframe; a floor above the underframe, said floor being spaced from said underframe; longitudinally extending stringers interposed between the underframe and the floor; dumping openings adjacent each side wall of the car, said openings on one side of the center of the car being alternated with fixed floor sections, the doors adjacent one side wall of the car being transversely alined with fixed floor sections adjacent the opposite side wall of the car; dumping doors for each of said openings, each said door being hinged to one of said floor supporting stringers.

15. In a dump car, the combination with an underframe; of a floor disposed above said underframe and spaced therefrom; a dumping opening in the floor of the car; a side wall having a lower chord member in contact with the underframe; a stringer carried by said lower chord member and adapted to have its upper surface substantially level with the upper surface of the floor; edge plates carried by said floor and stringer, said edge plates being adapted to project in the space of the door opening; and a dumping door disposed beneath said edge plates.

16. In a dump car having sides and ends; an underframe including a longitudinal center sill and cross members extending outwardly therefrom, said cross members being spaced from each other to form a series of panels; a side wall having a flanged member seated upon the cross members; a floor spaced above said underframe; longitudinal stringers interposed between the underframe and the floor; a series of dumping doors disposed in the floor of the car, each said door being disposed intermediate a pair of cross members, said doors being disposed in each alternate panel formed between the cross members, each door on one side of the center sill being transversely alined with a fixed floor section on the opposite side of the center sill, each said door being hinged to one of the stringer members.

17. In a dump car, the combination with the trucks; of flooring disposed above said trucks; dumping doors disposed in the said flooring above the trucks and also intermediately of the said trucks; crank arms for operating said doors independently of each other, the cranks operating the doors above the trucks being of shorter length than those operating the doors intermediately of the trucks.

18. In a dump car having a series of panels in the floor thereof defined by a series of transversely extending cross beams spaced from each other; dumping doors disposed in each said alternate panel; fixed floor sections disposed in the respective panels intermediate the doors; door raising and locking mechanisms for each of said doors, said means being pivotally mounted adjacent the side edges of the doors; and actuating means for the said door mechanisms mounted at the end of each of said doors and beneath the adjacent fixed floor sections.

19. In a dump car having a substantially flat floor, the combination with the side walls and end walls of the car; of a series of dumping openings arranged longitudinally of the car, said dumping openings being arranged in staggered relation with fixed floor sections; means for raising each of said doors independently of each other, each said means including a crank shaft pivotally mounted adjacent each end of the respective doors; and means at one end of each shaft for imparting a movement of rotation to the said crank shaft, each said means being disposed beneath the fixed floor section adjacent to the door.

20. In a dump car having trucks, center sill, side walls and bolster members extending from the center sill to the respective side walls of the car; of a dumping door disposed in the floor of the car above the truck, said door being disposed between the bolster and the end wall of the car and hinged intermediately of the center sill and side wall of the car to swing on a longitudinally extending axis; a crank arm pivotally mounted at one end upon the bolster and at the other end on the end wall of the car, said crank arm having shaft rotating means on the end of the shaft adjacent the bolster; and clutch mechanism interposed between said shaft rotating means and the crank arm.

21. In a dump car having a substantially flat floor, the combination with the trucks thereof; of dumping doors disposed above the trucks and also intermediate of the said trucks; individual operating means permitting independent operation of any of said doors, each said means including a crank arm adapted to form a support for its door in both its open and closed positions and also operating as a raising means for the door, the door mechanisms above the trucks being formed to provide for a lesser opening for the corresponding door as compared with the doors intermediate said trucks.

22. In a dump car, the combination with a substantially level floor; of trucks near each end of said car; a longitudinal center sill; cross beams extending outwardly from the said center sill; a series of dumping doors disposed at intervals throughout the length of the car, some of said doors being disposed above the trucks and others intermediately of the trucks, said intermediate doors being adapted to have a greater amount of opening than those above the trucks; and mechanisms for individually operating each door independently of any of the other doors, said mechanisms including crank arms pivotally mounted adjacent the side edges of the doors, the crank arms for the intermediate doors being provided with roller means intermediate the crank arms and the doors and the mechanism for the doors above the trucks being adapted to directly engage the doors without the interposition of rollers.

23. In a dump car having side and end walls, an underframe including a longitudinal center sill and body bolsters outstanding therefrom, said body bolster including a plurality of sections disposed in spaced relation to each other, said bolster being spaced longitudinally of the car an appreciable distance from its adjacent car end wall; a longitudinally extending stringer extending from the end wall of the car to the body bolster, said stringer being disposed outwardly from the center sill; a dumping door hingedly mounted upon said stringer and adapted to close with its free edge adjacent the car side wall; raising and lowering means for the said door including a crank shaft pivotally mounted in supports disposed at the respective side edges of the door, one of said supports for the crank shaft depending from the end wall of the car and the other support being mounted upon the body bolster, said crank shaft having one end thereof extended inwardly through the spaced sections of the bolsters; shaft rotating means disposed on the crank shaft inwardly of the support on the body bolster, said shaft rotating means including a fixed member rigidly united with the crank shaft and a loosely mounted member adapted to co-act with said fixed member after a predetermined degree of free movement.

In witness that I claim the foregoing I have hereunto subscribed my name this 3rd day of August, 1925.

ARGYLE CAMPBELL.